(12) United States Patent
Tao et al.

(10) Patent No.: US 9,214,025 B2
(45) Date of Patent: Dec. 15, 2015

(54) DEPTH ESTIMATION USING NORMALIZED DISPLACEMENT OF IMAGE PAIRS

(71) Applicant: Adobe Systems Incorporated, San Jose, CA (US)

(72) Inventors: Michael Wish Tao, Manteca, CA (US); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 425 days.

(21) Appl. No.: 13/690,460

(22) Filed: Nov. 30, 2012

(65) Prior Publication Data

US 2014/0153783 A1 Jun. 5, 2014

(51) Int. Cl.
  *G06K 9/00* (2006.01)
  *G06T 7/00* (2006.01)
(52) U.S. Cl.
  CPC ..... *G06T 7/0075* (2013.01); *G06T 2207/10021* (2013.01); *G06T 2207/10052* (2013.01)
(58) Field of Classification Search
  None
  See application file for complete search history.

(56) References Cited

U.S. PATENT DOCUMENTS

| | | | | |
|---|---|---|---|---|
| 5,911,035 A | * | 6/1999 | Tsao | 706/16 |
| 8,149,268 B1 | * | 4/2012 | Meyers et al. | 348/42 |
| 2002/0024517 A1 | * | 2/2002 | Yamaguchi et al. | 345/424 |
| 2002/0191838 A1 | * | 12/2002 | Setterholm | 382/154 |
| 2006/0056727 A1 | * | 3/2006 | Jones et al. | 382/276 |
| 2010/0166256 A1 | * | 7/2010 | Kmiecik et al. | 382/103 |
| 2012/0321172 A1 | * | 12/2012 | Jachalsky et al. | 382/154 |
| 2013/0142415 A1 | | 6/2013 | Ali et al. | |
| 2013/0321790 A1 | * | 12/2013 | Kirby | 356/3.14 |
| 2014/0016857 A1 | * | 1/2014 | Richards | 382/154 |

OTHER PUBLICATIONS

Bishop et al ("Full-Resolution Depth Map Estimation from an Aliased Plenoptic Light Field"), 2010.*
"Epipolar (Stereo) Geometry," Retrieved From: http://www.cse.unr.edu/~bebis/CS791E/Notes/EpipolarGeonetry.pdf, pp. 16.
Bishop, et al., "Full-Resolution Depth Map Estimation from an Aliased Plenoptic Light Field," ACCV, 2011, 186-200.
Bishop, et al., "Plenoptic Depth Estimation From Multiple Aliased Views," Department of Engineering and Physical Sciences Heriot-Watt University, Edinburgh, UK, pp. 1-8.

(Continued)

*Primary Examiner* — Avinash Yentrapati
(74) *Attorney, Agent, or Firm* — Kilpatrick Townsend & Stockton LLP (57) ABSTRACT

Systems and methods are provided for depth map estimation using normalized displacement of image pairs. In one embodiment, an image manipulation application identifies image pairs from an input image. Each of the image pairs includes an image portion from a first perspective and the image portion from a second perspective. The image manipulation generates displacement vectors for the image pairs. Each of the displacement vectors represents at least one of a horizontal displacement and a vertical displacement of the image portion from the first perspective to the second perspective. The image manipulation application generates normalized displacement vectors corresponding to the displacement vectors. Each of the normalized displacement vectors is generated by transforming a respective orientation of a corresponding one of the displacement vectors to a common reference direction. The image manipulation application generates a depth map based on the normalized displacement vectors.

14 Claims, 6 Drawing Sheets

(56) References Cited

OTHER PUBLICATIONS

Dansereau, et al., "Gradient-Based Depth Estimation from 4D Light Fields," Dept of Electrical and Computer Engineering, University of Calgary, Alberta, Canada, pp. 4.

Ekmekcioglu, et al., "Efficient Edge, Motion and Depth-Range Adaptive Processing for Enhancement of Multi-view Depth Map Sequences," Centre for Co. Systems Research, University of Surrey, Guildford, UK, Deutsche Telekom Laboratories, Technische Universitiit Berlin, Germany, Nov. 2009, pp. 4.

Johnston, "Learning Depth in Light Field Images," pp. 4.

Levin, et al., "Image and Depth from a Conventional Camera with a Coded Aperture," Massachusens Institute of Technology, Computer Science and Artificial Intelligence Laboratory, pp. 9.

Ng, "Digital Light Field Photography," available at http://www.lytro.com/renng-thesis.pdf, Jul. 2006, 203 pages, downloaded from the internet on Aug. 30, 2008.

Baker et al., Generalizing Epipolar-Plane Image Analysis on the Spatiotemporal Surface, International Journal of Computer vision 3.1, 1989, pp. 33-49.

Mellor, et al., Dense Depth Maps from Epipolar Images, Nov. 1996, Massachusetts Institute of Technology Artifiicial Intelligence Laboratory, 13 pages.

Horstmeyer, et al., Flexible Multimodal Camera Using a Light Field Architecture, Computational Photography (ICCP), 2009, IEEE International Conference IEEE, 8 pages.

First Action Interview Pilot Program Pre-Interview Communication from related U.S. Appl. No. 13/690,514 dated Mar. 13, 2015, 4 pages.

First Action Interview Office Action Summary from related U.S. Appl. No. 13/690,514 dated May 26, 2015, 9 pages.

* cited by examiner

DEPTH ESTIMATION USING NORMALIZED DISPLACEMENT OF IMAGE PAIRS

TECHNICAL FIELD

This disclosure relates generally to computer-implemented methods and systems and more particularly relates to depth map estimation using normalized displacement of image pairs.

CROSS-REFERENCE TO RELATED APPLICATION

U.S. patent application Ser. No. 13/690,514, entitled "Depth Estimation Using Three-Dimensional Epipolar Data Structures", filed on the same day as the present application and naming Michael Tao and Sunil Hadap as inventors, is incorporated by reference herein in its entirety.

BACKGROUND

Image manipulation programs are used to modify or otherwise use image content captured using a camera. For example, an image manipulation program can generate a depth map. A depth map describes the "depth" of different objects in an image. The depth of an object in an image is distance between the object from a given view point such as camera used to capture the image. By generating a depth map describing the depths of various objects in an image, an image manipulation application can generate three-dimensional image content from two or more images captured from one or more viewpoints and depicting at least some of the same objects.

Figure 1:
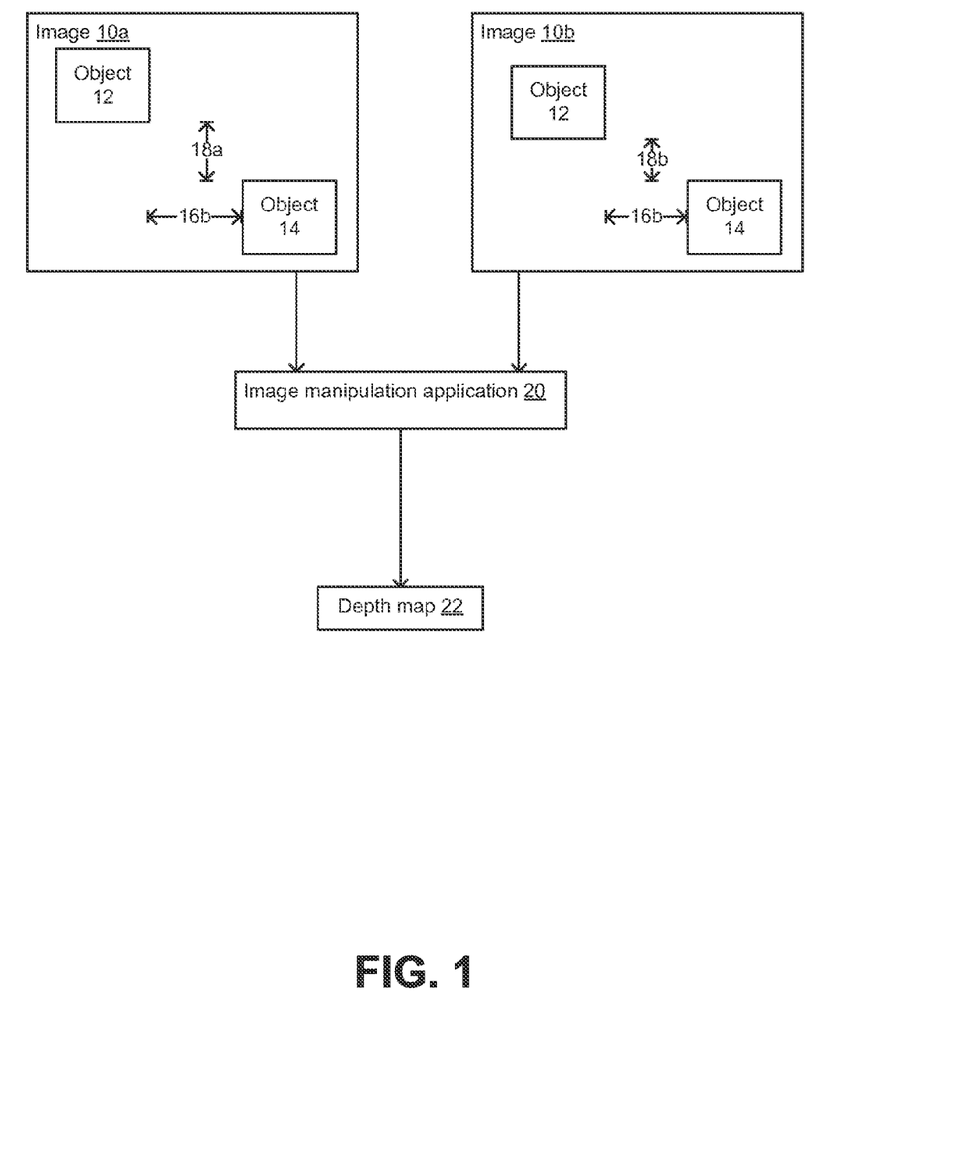
FIG. 1 is a modeling diagram depicting an image manipulation algorithm generating a depth map from input images.

For example, FIG. 1 is a modeling diagram depicting an image manipulation algorithm 20 generating a depth map 22 from input images 10a, 10b. The images 10a, 10b can include image content captured by a camera from two perspectives. The difference in perspectives between images 10a, 10b causes a horizontal distance 16a between objects 12, 14 in image 10a to change to a horizontal distance 16b between objects 12, 14 in image 10b. The difference in perspectives between images 10a, 10b also causes a vertical distance 18a between objects 12, 14 in image 10a to change to a vertical distance 18b between objects 12, 14 in image 10b. The image manipulation application 20 can generate a depth map 22 using the difference between horizontal distances 16a, 16b and the difference between vertical distances 18a, 18b. The depth map 22 can describe a distance between the objects 12, 14 and a camera used to capture images 10a, 10b. The depth map 22 can be used to, for example, generate three-dimensional content using images 10a, 10b.

One existing solution for generating a depth map involves using a stereo algorithm to perform depth estimation. Stereo algorithms take two images and estimate the displacement of each pixel only along an x axis rather than on both an x axis and a y axis. Among other deficiencies, stereo-algorithms require epipolar geometric correction to generate depth-maps. Epipolar geometric correction involves two or more images being captured such that the two or more images are aligned in one dimension (i.e., a y axis) such that displacement occurs only in another dimension (i.e., the x axis). Manufacturing limitations of consumer light-field cameras limit the feasibility of making such calibrations.

Another existing solution for generating a depth map involves using an optical flow algorithm to perform depth estimation. An optical flow algorithm receives two images as inputs. The optical flow algorithm estimates the displacement between the two images of each pixel on both an x axis and a y axis. Among other deficiencies, the expanded search space used by optical flow algorithms (i.e., both the x and y) result in poor quality of depth estimation.

Accordingly, systems and methods are desirable for improving the accuracy of depth estimation.

SUMMARY

One embodiment involves identifying image pairs from an input image. Each of the image pairs includes an image portion from a first perspective and the image portion from a second perspective. The embodiment further involves generating displacement vectors for the image pairs. Each of the displacement vectors represents at least one of a horizontal displacement and a vertical displacement of the image portion from the first perspective to the second perspective. The embodiment further involves generating normalized displacement vectors corresponding to the displacement vectors. Each of the normalized displacement vectors is generated by transforming a respective orientation of a corresponding one of the displacement vectors to a common reference direction. The embodiment further involves generating a depth map based on the normalized displacement vectors.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Computer-implemented systems and methods are disclosed for normalizing image pairs used for depth estimation.

For example, a depth map used to describe the orientation of objects to one another in an image can be generated by comparing two images captured from different perspectives, such as a first image of a chair and table captured from a center perspective and a second image of the chair and table captured from a left-of-center perspective. Images from different perspectives can be captured by specialized imaging devices, such as light-field cameras, that capture image content from multiple perspectives using a micro lens array. A depth map can be generated by comparing difference in the distance between the objects in the first image and the distance between the objects in the second image. An image manipulation application processes the images in software such that the apparent displacement of the objects between the images occurs in only one dimension. Processing the images can include "normalizing" the displacement of different objects or image portions between the two images to a common reference direction. The image manipulation application can thus generate a depth map based on displacement of objects in the reference direction. Depth estimation using angle normalization can provide an adaptable and accurate algorithm that exploits light-field data to provide a high quality depth without requiring calibration of an imaging device to perform epipolar geometric correction.

In accordance with one embodiment, an image manipulation application extracts or otherwise determines image pairs from an input image. Each image pair includes at least some of the same image content, such as an object present in each of the images of the image pair. For each image pair, a first image includes an image portion captured from a first perspective and a second image includes the image portion captured from a second perspective. For example, an imaging device, such as a light-field camera, can capture an input image depicting a room. The image of the room captured by the light-field camera includes the image taken from multiple perspectives that are offset from one another, such as a leftward perspective and a rightward perspective. An image pair from the input image can include an image portion that includes objects, such as a table a table and a chair, captured from each perspective. The objects may have a given distance from one another in the images respectively corresponding to the leftward perspective and the rightward perspective. A change from the rightward perspective image to the leftward perspective image can cause a change in the apparent distance between the objects, such that the table and chair appear closer together in the rightward perspective image than the leftward perspective image. The image manipulation application determines displacement vectors for the image pairs that describe corresponding displacements between the images of image pairs. Each displacement vector represents at least one of a horizontal displacement and a vertical displacement of the image portion from the first perspective to the second perspective. For example, an image pair depicting a table from two different perspectives can be associated with a vector describing the apparent shift in the position of the table from the center of the first image to the left-hand side of the second image. The image manipulation application normalizes the displacement vectors to generate normalized displacement vectors. Each normalized displacement vector is determined by transforming a respective orientation of a corresponding displacement vectors to a common reference direction. Normalizing the displacement vectors can provide more accurate data for a depth map estimation algorithm. The image manipulation application can generate a depth map based on the normalized displacement vectors.

As used herein, the term "image content" is used to refer to any image that can be rendered for display or use at a computing system or other electronic device. Image content can include still images, video, or any combination thereof.

As used herein, the term "depth map" is used to refer to data describing the distance of surfaces of objects in image content from the viewpoint of a camera or another imaging device that captures the image content.

As used herein, the term "displacement vector" is used to refer to a vector describing a change in the position of an object in a plane. Any suitable vector form can be used for describing a change in the position of the object. A non-limiting example of a displacement vector can have a form (x, y), where x is a value describing a displacement in a horizontal direction of an x-y plane and y is a value describing a displacement in a vertical direction of the x-y plane.

As used herein, the term "normalize" is used to refer to a process for modifying data in a data set such that different data in the data set have a common set of attributes for comparison. For example, normalizing a first displacement vector describing movement in only a horizontal direction and a second displacement vector describing movement in both a horizontal and a vertical direction can include transforming the second vector to a corresponding vector representing movement in only the horizontal direction. Normalizing the first and second vectors to describe movement in a common direction can allow for a more efficient comparison of the data values represented by the vectors.

In some embodiments, the image pairs can be determined using super-pixels captured by a light-field camera. The image manipulation application can access an input image that includes super-pixels, such as an image captured by a light-field camera. The image manipulation application can extract from the super-pixels all pixels corresponding to a center perspective and all pixels corresponding to the right-hand perspective. The image pairs can be generated from a first image that includes the pixels for the center perspective and a second image that includes the pixels for the right-hand perspective.

As used herein, the term "super-pixel" is used to refer to a pixel encoding image data from multiple perspectives. A super-pixel can be generated by an imaging device that includes a micro-lens array configured to capture image content from multiple perspectives simultaneously. Each super-pixel of the image content can include a respective pixel corresponding to each perspective.

In additional or alternative embodiments, the image manipulation can average normalized displacement vectors for generating the depth map. Averaging the results can reduce the effects of noise, displacement errors, outliers, etc. in a resulting depth map. Increasing the number of image pairs used from the super-pixel to determine displacement can reduce the effect of an error in determining the displacement of any given image pair. In some embodiments, the image manipulation application can perform weighted averaging. The weighted average can be performed based on the estimated error for each of the image pairs. Displacement vectors can be weighted more heavily based on a lower estimated error (and therefore a higher confidence in the displacement vector). Weighted averaging can further reduce the effect of potential errors introduced by low-confidence displacement vectors.

Figure 2:
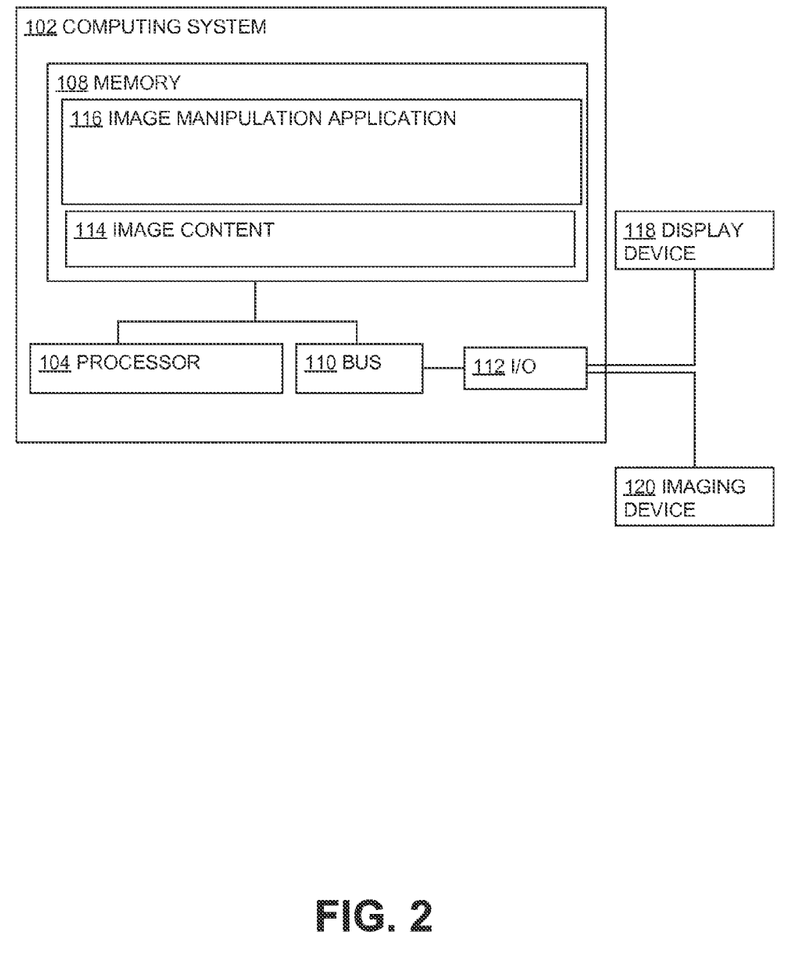
FIG. 2 is a block diagram depicting an example computing system for implementing certain embodiments.

Referring now to the drawings, FIG. 2 is a block diagram depicting an example computing system 102 for implementing certain embodiments.

The computing system 102 includes a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 118, and an imaging device 120. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 120 is a camera having an energy source, such as a light emitting diode ("LED"), and an optical sensor. An imaging device 120 can include other optical components, such as an imaging lens, imaging window, an infrared filter, and an LED lens or window. In some embodiments, the imaging device 120 can be a separate device configured to communicate with the computing system 102 via the I/O interface 112. In other embodiments, the imaging device 120 can be integrated with the computing system 102. In some embodiments, the processor 104 can cause the computing system 102 to copy or transfer image content 114 from memory of the imaging device 120 to the memory 108. In other embodiments, the processor 104 can additionally or alternatively cause the computing system 102 to receive image content 114 captured by the imaging device 120 and store the image content 114 to the memory 108.

Figure 3:
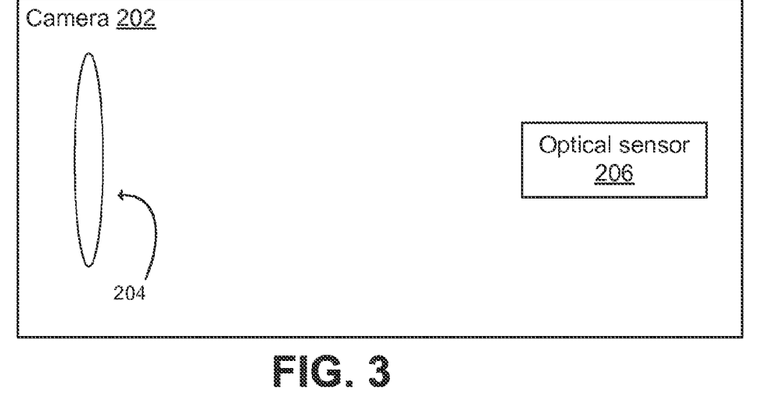
FIG. 3 is a block diagram depicting a conventional camera.
Figure 4:
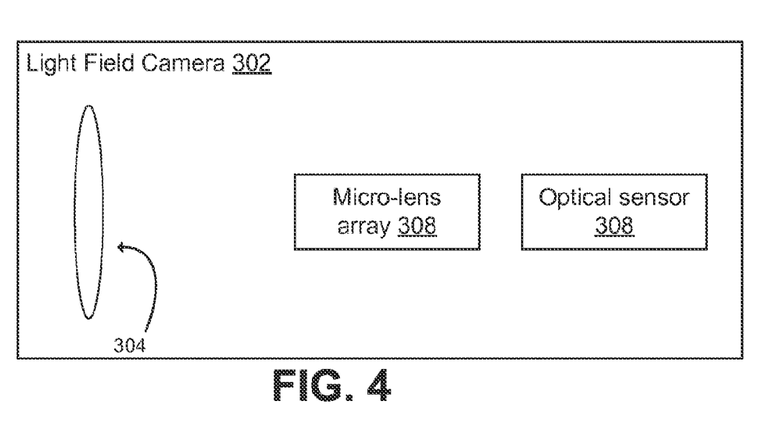
FIG. 4 is a block diagram depicting a light-field camera having a micro-lens array.
Figure 5:
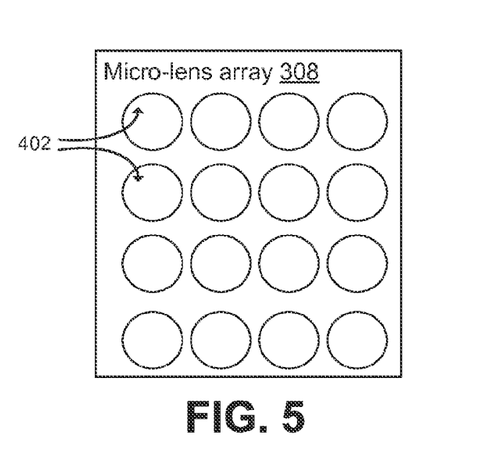
FIG. 5 is a modeling diagram depicting an micro-lens array of a light-field camera.

An imaging device 120 can be a light-field camera. FIGS. 3-5 depict a comparison between a light-field camera and a conventional camera. As depicted in FIG. 3, a conventional camera 202 can include a lens 204 positioned adjacent to a sensor 206. As depicted in FIG. 4, a light-field camera 302 can include a micro-lens array 306 positioned between a lens 304 and a sensor 308. As depicted in FIG. 5, the micro-lens array 306 can include multiple lenses 402. Each of the lenses 402 is a small lens calibrated with respect to each of the other lenses 402.

An image manipulation application 116 stored in the memory 108 can configure the processor 104 to modify, access, render, or otherwise use the image content 114 for display at the display device 118. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 6:
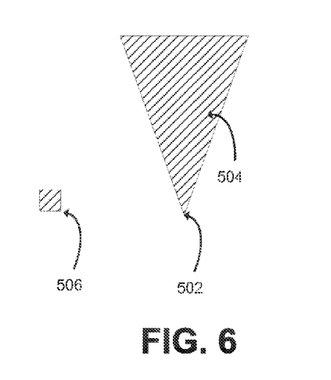
FIG. 6 is a modeling diagram depicting a conventional camera capturing an image from a single perspective.
Figure 7:
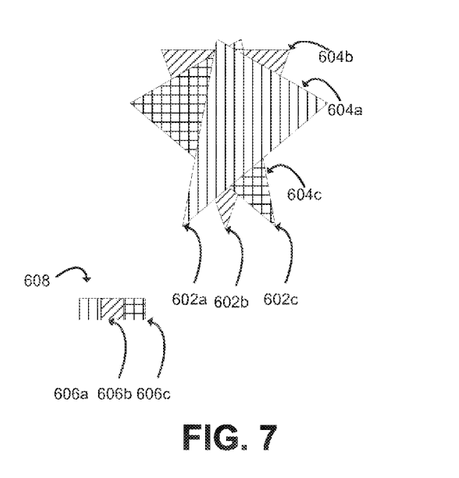
FIG. 7 is a modeling diagram depicting a light-field camera capturing an image from multiple perspectives.

An imaging device 120 that is a light-field camera 302 can provide advantages over a conventional camera 202, as depicted in FIGS. 6-7. FIG. 6 is a modeling diagram depicting a conventional camera 202 capturing an image from a single perspective 502. The conventional camera 202 can capture image content within a view 504 from the perspective 502. Each pixel 506 of the image content captured from the perspective 502 is from a single perspective.

FIG. 7 is a modeling diagram depicting a light-field camera 302 capturing an image from multiple perspectives. Each of the lenses 402 of the micro-lens array 306 can capture an image from a different perspective than one or more adjacent lenses 402.

For example, as depicted in FIG. 7, a light-field camera 302 can capture image content from a left-hand perspective 602*a*. The triangle representing a left-hand view 604*a* includes the field of view for the lens that captures image content from the left-hand perspective 602*a*. The light-field camera 302 can also capture image content from a center perspective 602*b*. The triangle representing a center view 604*b* includes the field of view for the lens that captures image content from the center perspective 602*b*. The light-field camera 302 can also capture image content from a right-hand perspective 602*c*. The triangle representing a right-hand view 604*c* includes the field of view for the lens that captures image content from the right-hand perspective 602*c*.

A given portion of an image can be represented by a group of pixels providing a "super-pixel," such as a super-pixel 608. The super-pixel 608 can include, for example, pixels 606*a-c* of a given portion of an object captured from corresponding perspectives 602*a-c*. Although FIG. 7 depicts a super-pixel having three pixels 606*a-c* for purposes of simplicity, a super-pixel can include any number of pixels captured by a micro-lens array 306.

Figure 8:
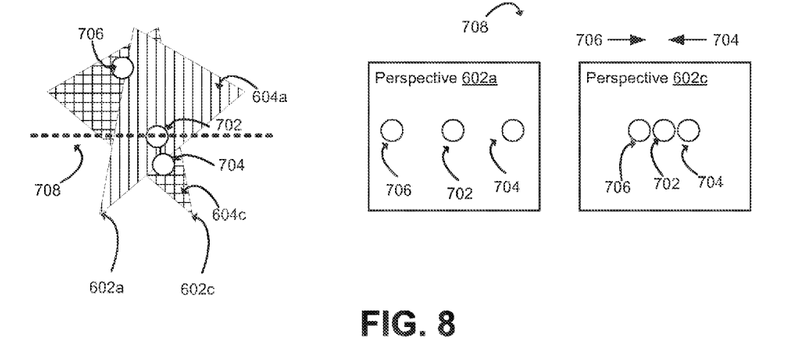
FIG. 8 is a modeling diagram depicting an apparent displacement of objects from a left-hand perspective to a right-hand perspective in a focal plane.

FIG. 8 is a modeling diagram depicting an apparent displacement of objects 702, 704, 706 from a left-hand perspective 602*a* to a right-hand perspective 602*c* in a focal plane 708. The perspectives 602*a*, 602*c* depicted in FIG. 8 correspond to respective lenses capturing image content within their respective fields of view. A first lens, such as a lens of the light-field camera 302, can be positioned to capture image content from a perspective 602*a*. The image content captured from the perspective 602*a* includes each of the objects 702, 704, 706 that are wholly or partially within a view 604*a*. A second lens, such as a lens of the light-field camera 302, can be positioned to capture image content from a perspective 602*c*. The image content captured from the perspective 602*c* includes each of the objects 702, 704, 706 that are wholly or partially within a view 604*c*. A focal plane 708 is a plane within each of the view 604*a*, 604*c* in which a given object, such as the object 702, is in focus.

FIG. 8 depicts the apparent displacement of objects 702, 704, and 706 with respect to one another between the perspectives 602a, 602c. As depicted in FIG. 8, objects in the focal plane 708 are not vertically displaced between an image corresponding to the left-hand perspective 602a and an image corresponding to the right-hand perspective 602c. Objects closer to an imaging device 120 than the focal plane appear displaced in a first direction. For example, an object 704 that is closer to an imaging device than the focal plane 708 is displaced in a leftward direction, as depicted in the leftward arrow of FIG. 8 indicating the displacement of object 704 from the left-hand perspective 602a to the right-hand perspective 602c. Objects further from an imaging device 120 than the focal plane can be displaced in a second direction. For example, an object 706 that is further from an imaging device 120 than the focal plane 708 is displaced in a rightward direction, as depicted in the rightward arrow of FIG. 8 indicating the displacement of object 706 from the left-hand perspective 602a to the right-hand perspective 602c. The displacement of objects 704, 706 in a leftward or rightward direction can indicate a respective distance from the imaging device 120 to each of the respective objects 704, 706 (i.e., a "depth" of each object in the image).

The image manipulation application 116 can use pairs of images to determine the displacement of objects between the images and thereby generate a depth map based on the displacement. The image manipulation application 116 can identify or otherwise determine image pairs from super-pixels, as depicted in FIGS. 9-11.

Figure 9:
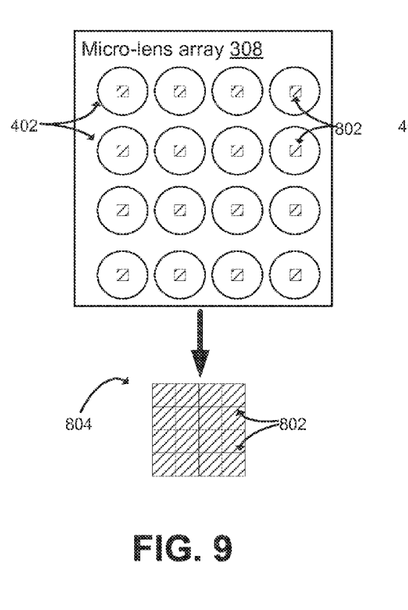
FIG. 9 is a modeling diagram depicting an image obtained by selecting center pixels from super-pixels generated by a light-field camera.

FIG. 9 is a modeling diagram depicting an image 804 obtained by selecting center pixels 802 from super-pixels generated by a light-field camera 302. The image manipulation application 116 can obtain an image 804 by selecting the center pixels 802 from each super-pixel and concatenating the center pixels 802. The image 804 can be an image captured from a center perspective 606b.

Figure 10:
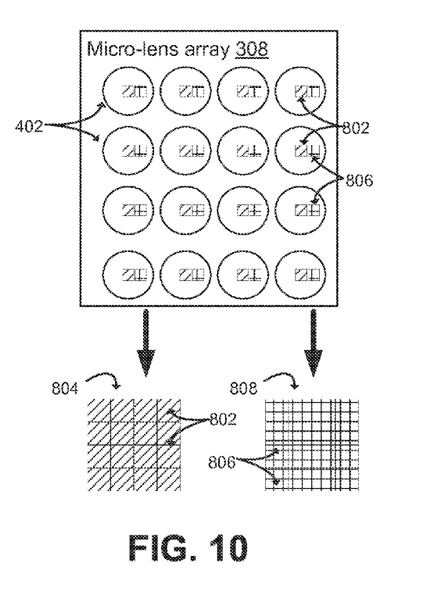
FIG. 10 is a modeling diagram depicting an image obtained by selecting center pixels from super-pixels generated by a light-field camera and an image obtained by selecting right-hand pixels from super-pixels generated by a light-field camera.
Figure 11:
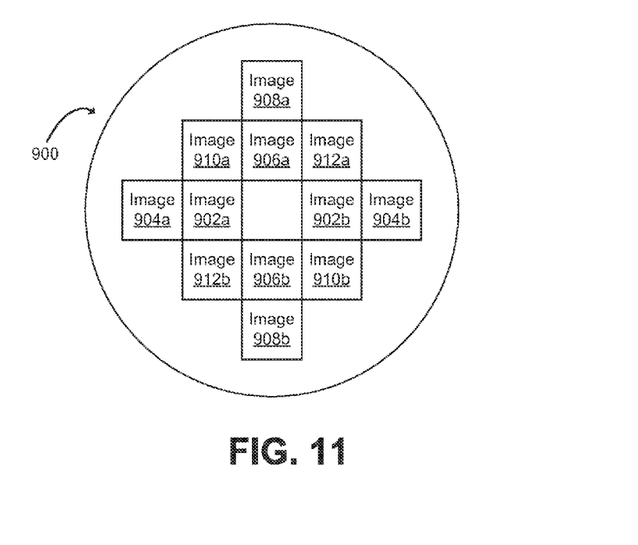
FIG. 11 is a modeling diagram depicting an image pair distribution of a super-pixel.

FIG. 10 is a modeling diagram depicting an image 804 obtained by selecting center pixels 802 from super-pixels generated by a light-field camera 302 and an image 808 obtained by selecting right-hand pixels 806 from super-pixels generated by a light-field camera. The image manipulation application 116 can obtain an image 808 by selecting the right-hand pixels 806 from each super-pixel and concatenating the right-hand pixels 806. The image 808 can be an image captured from a right-hand perspective 606c. The image manipulation application 116 can obtain two images 804, 808 by selecting two different pixel locations within the super-pixels and corresponding to two different perspectives from which the image content is captured by a light-field camera 302.

The image manipulation application 116 can execute an optical flow algorithm or other depth estimation algorithm using the displacement between objects in an image 804 and an image 808 to generate a depth estimation map. The accuracy of an optical flow algorithm can be improved by obtained multiple image pairs. A super-pixel can be used to generate the multiple image pairs.

FIG. 11 depicts an image pair distribution of a super-pixel 900. The super-pixel 900 is generated by a light-field camera 302 encoding pixel data describing different perspectives of an image. The image manipulation application 116 can access one or more super-pixels, such as super-pixel 900, from light-field data captured by a light-field camera 302 or other suitable imaging device 120. The image manipulation application 116 can identify image pairs that are symmetrically distant from a center of a super-pixel and have midpoints on the center of the super-pixel 900.

For example, the image pair distribution of the super-pixel 900 can include image pairs that include images 902a, 902b, 904a, 904b, 906a, 906b, 908a, 908b, 910a, 910b, 912a, 912b. The pairs of images can be selected from any suitable regions of the two different input images. Images 902a, 902b are horizontally spaced from the center of the super-pixel 900 by the same distance and are aligned with the center of the super-pixel 900. Images 904a, 904b are horizontally spaced from the center of the super-pixel 900 by the same distance and are aligned with the center of the super-pixel 900. Images 906a, 906b are vertically spaced from the center of the super-pixel 900 by the same distance and are aligned with the center of the super-pixel 900. Images 908a, 908b are vertically spaced from the center of the super-pixel 900 by the same distance and are aligned with the center of the super-pixel 900. Images 910a, 910b are diagonally spaced from the center of the super-pixel 900 by the same distance and are aligned with the center of the super-pixel 900. Images 912a, 912b are diagonally spaced from the center of the super-pixel 900 by the same distance and are aligned with the center of the super-pixel 900.

Although FIG. 11 depicts six image pairs used by an image manipulation application 116, any number of image pairs can be used.

The image manipulation application 116 can execute any suitable optical flow algorithm to determine an optical flow displacement (i.e., a vertical and horizontal displacement) for each image pair. The magnitude and direction of the displacement can be used to generate a depth map. Using an optical flow algorithm can account for both a vertical and a horizontal displacement of objects between perspectives.

The various image pairs of a super-pixel 900 are oriented in different directions from one another. For example, as depicted in FIG. 11, a first image pair includes images 910a, 910b that are oriented diagonally from one another with respect to the center of the super-pixel 900 and a second image pair includes images 906a, 906b that are oriented vertically from one another with respect to the center of the super-pixel 900. The image manipulation application 116 can compare a first displacement of objects between images 910a, 910b and a second displacement of objects between images 906a, 906b. The different orientations of the respective image pairs can increase the complexity of comparing the first and second displacements.

The complexity of comparing the apparent displacement of objects between image pairs can be reduced by normalizing the orientation of the various image pairs. The image manipulation application 116 can perform angle normalization using super-pixel information. Angle normalization includes transforming the orientation of an image pair such that the image pair is oriented in the same direction as a reference direction. Normalizing each image pair such that all of the image pairs have a common reference direction can allow the image manipulation algorithm to determine the displacement in the common reference direction. Determining the displacement in a single direction can improve the accuracy of a depth map determined using the displacement between image pairs.

The image manipulation application 116 can use some or all of the image pairs of the super-pixel 900 to determine the displacement between the two perspectives. For example, the image manipulation application 116 can select a common reference direction based on the orientation of the image pair that includes the images 902a, 902b. The image manipulation application can normalize all other image pairs in FIG. 8 with respect to the orientation of the image pair that includes the images 902a, 902b. The image manipulation application 116 can compute an angle between a first image pair and each other image pair. The image manipulation application 116 can generate a normalized version of each other image pair using cosine and sine data with respect to the angle between the first image pair and each other image pair. The image manipulation application 116 can normalize a displacement vector (x, y) describing the displacement between an image pair in an x-y plane to obtain a normalized displacement vector $(x_{normalized}, y_{normalized})=(x \cos(\theta), y \sin(\theta))$.

The image manipulation application 116 can determine the displacement for each normalized image pair from a corresponding normalized displacement vector. The image manipulation application 116 can generate a depth map based on the normalized displacement vectors describing the displacement between the image pairs.

In additional or alternative embodiments, the image manipulation application 116 can average the normalized displacement vectors. Averaging the normalized displacement vectors can reduce the effects of noise, displacement errors, outliers, etc. in a resulting depth map by reducing the effects of those errors in determining the displacement of each image pair. Increasing the number of image pairs used from the super-pixel to determine displacement can also reduce the effect of an error in determining the displacement of any given image pair.

In additional or alternative aspects, the image manipulation application 116 can perform weighted averaging. The weighted average can be performed based on the estimated error for each of the image pairs. Displacement vectors can be weighted more heavily based on a lower estimated error (and therefore a higher confidence in the displacement vector). Error can be estimated based on, for example, whether a given displacement vector generated by the image manipulation application 116 is vastly different from other calculated displacement vectors.

Figure 12:
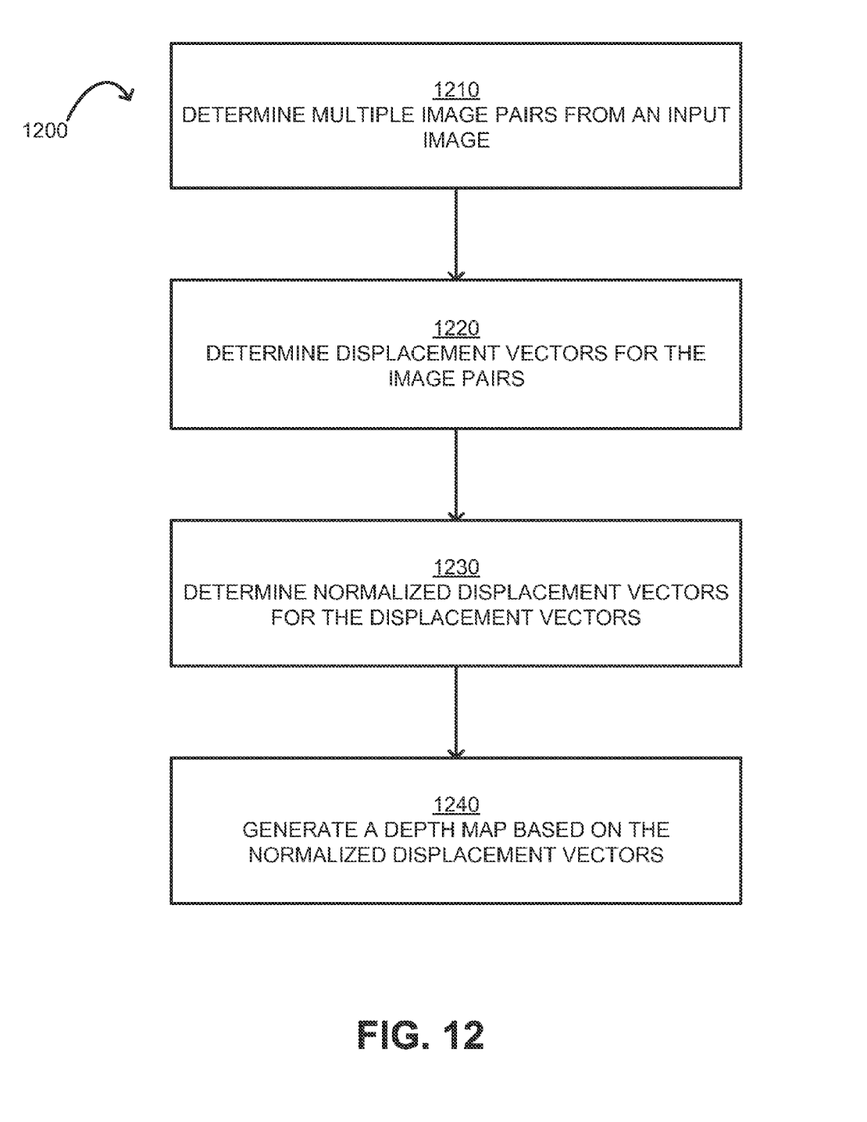
FIG. 12 is a flow chart illustrating an example method for generating normalized displacement vectors used for generating a depth map.

FIG. 12 is a flow chart illustrating an example method 1200 for generating normalized displacement vectors used for generating a depth map. For illustrative purposes, the method 1200 is described with reference to the system implementation depicted in FIG. 3. Other implementations, however, are possible.

The method 1200 involves identifying multiple image pairs from an input image, as shown in block 1210. Each of the image pairs can include an image portion from a first perspective and the image portion from a second perspective. The processor 104 of the computing system 102 can execute the image manipulation application 116 to identify or otherwise determine the image pairs. For example, the image manipulation application 116 can access an input image captured by an imaging device 120 such as a light-field camera 302. The input image can include super-pixels, such as a super-pixel 900. The image manipulation application 116 can extract image data for at least two perspectives, such as the pixels 802 corresponding to a center perspective 602b and the pixels 806 corresponding to the right-hand perspective 602c.

The method 1200 further involves generating displacement vectors for the image pairs, as shown in block 1220. Each of the displacement vectors represents at least one of a horizontal displacement and a vertical displacement of the image portion from the first perspective to the second perspective. The processor 104 of the computing system 102 can execute the image manipulation application 116 to generate or otherwise determine the displacement vectors. For example, the image manipulation application 116 can execute an optical flow algorithm or other suitable algorithm for calculating or otherwise determining the displacement in an x-y plane between the images in each image pair. The output of the optical flow algorithm or other suitable algorithm can be a displacement vector for each image pair describing the displacement in the x-y plane.

The method 1200 further involves generating normalized displacement vectors for the displacement vectors, as shown in block 1230. The processor 104 of the computing system 102 can execute the image manipulation application 116 to normalize the displacement vectors. The image manipulation application 116 can normalize each of the displacement vectors by transforming a respective orientation for the displacement vector to a common reference direction. For example, an image manipulation application 116 may select the orientation of a first image pair described by a first displacement vector as a reference direction and normalize the remaining displacement vectors such that the remaining displacement vectors have the same orientation as the first image pair.

The method 1200 further involves generating a depth map based on the normalized displacement vectors, as shown in block 1240. The processor 104 of the computing system 102 can execute the image manipulation application 116 to generate the depth map. The depth map can be generated using any suitable algorithm. Non-limiting examples of a suitable algorithm include a stereo flow algorithm and an optical flow algorithm.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   identifying, by an image manipulation application executed by a processing device, a plurality of image pairs from an input image, wherein each of the plurality of image pairs comprises an image portion from a first perspective and the image portion from a second perspective;
   generating, by the image manipulation application, a plurality of displacement vectors for the plurality of image pairs, wherein each of the plurality of displacement vectors represents at least one of a horizontal displacement and a vertical displacement of the image portion from the first perspective to the second perspective;
   generating, by the image manipulation application, a plurality of normalized displacement vectors corresponding to the plurality of displacement vectors, wherein each of the plurality of normalized displacement vectors is generated by transforming a respective orientation of a corresponding one of the plurality of displacement vectors to a common reference direction;
   assigning a respective confidence level to each of the plurality of normalized displacement vectors; and
   generating, by the image manipulation application, a depth map based on an average displacement vector that is determined from a weighted average of the plurality of normalized displacement vectors, wherein the weighted average is determined based on the confidence levels of the plurality of normalized displacement vectors.

2. The method of claim 1, wherein identifying the plurality of image pairs further comprises:
   receiving the input image, wherein the input image comprises a plurality of super-pixels, each super-pixel comprising image data encoded from multiple perspectives; and
   extracting respective image data encoded from at least two perspectives from at least some of the plurality of super-pixels.

3. The method of claim 1, wherein the plurality of displacement vectors is generated by executing an optical flow algorithm.

4. The method of claim 1, wherein the reference direction comprises an orientation of at least one of the plurality of displacement vectors.

5. The method of claim 1, further comprising:
   capturing, by an imaging device in which the processor is disposed, the input image; and
   storing, by the imaging device, the input image to a non-transitory computer-readable medium accessible by the processor.

6. A non-transitory computer-readable medium embodying program code executable by a processing device, the non-transitory computer-readable medium comprising:
   program code for identifying a plurality of image pairs from an input image, wherein each of the plurality of image pairs comprises an image portion from a first perspective and the image portion from a second perspective;
   program code for generating a plurality of displacement vectors for the plurality of image pairs, wherein each of the plurality of displacement vectors represents at least one of a horizontal displacement and a vertical displacement of the image portion from the first perspective to the second perspective;
   program code for generating a plurality of normalized displacement vectors corresponding to the plurality of displacement vectors, wherein each of the plurality of normalized displacement vectors is generated by transforming a respective orientation of a corresponding one of the plurality of displacement vectors to a common reference direction;
   program code for assigning a respective confidence level to each of the plurality of normalized displacement vectors; and
   program code for generating a depth map based on an average displacement vector that is determined from a weighted average of the plurality of normalized displacement vectors, wherein the weighted average is determined based on the confidence levels of the plurality of normalized displacement vectors.

7. The non-transitory computer-readable medium of claim 6, wherein the program code for identifying the plurality of image pairs further comprises:
   program code for receiving the input image, wherein the input image comprises a plurality of super-pixels, each super-pixel comprising image data encoded from multiple perspectives; and
   program code for extracting respective image data encoded from at least two perspectives from at least some of the plurality of super-pixels.

8. The non-transitory computer-readable medium of claim 6, wherein program code for generating the plurality of displacement vectors comprises program code for executing an optical flow algorithm.

9. The non-transitory computer-readable medium of claim 6, wherein the reference direction comprises an orientation of at least one of the plurality of displacement vectors.

10. A system comprising:
    a processor configured to execute instructions stored in a non-transitory computer-readable medium;
    wherein the instructions comprise an image manipulation application configured to perform operations comprising:
       identifying a plurality of image pairs from an input image, wherein each of the plurality of image pairs comprises an image portion from a first perspective and the image portion from a second perspective,
       generating a plurality of displacement vectors for the plurality of image pairs, wherein each of the plurality of displacement vectors represents at least one of a horizontal displacement and a vertical displacement of the image portion from the first perspective to the second perspective,
       generating a plurality of normalized displacement vectors corresponding to the plurality of displacement vectors, wherein each of the plurality of normalized displacement vectors is generated by transforming a respective orientation of a corresponding one of the plurality of displacement vectors to a common reference direction, assigning a respective confidence level to each of the plurality of normalized displacement vectors, and generating a depth map based on an average displacement vector that is determined from a weighted average of the plurality of normalized displacement vectors, wherein the weighted average is determined based on the confidence levels of the plurality of normalized displacement vectors.

11. The system of claim 10, further comprising an imaging device configured to record the input image, wherein the processor is configured to receive the input image from the imaging device.

12. The system of claim 10, wherein the program code for identifying the plurality of image pairs further comprises:

program code for receiving the input image, wherein the input image comprises a plurality of super-pixels, each super-pixel comprising image data encoded from multiple perspectives; and program code for extracting respective image data encoded from at least two perspectives from at least some of the plurality of super-pixels.

13. The system of claim 10, wherein the plurality of displacement vectors are generated by executing an optical flow algorithm.

14. The system of claim 10, wherein the reference direction comprises an orientation of at least one of the plurality of displacement vectors.

* * * * *